United States Patent [19]

Funatsu et al.

[11] 4,167,006
[45] Sep. 4, 1979

[54] COLLISION AVOIDANCE SYSTEM OF AIRCRAFT

[75] Inventors: Chuhei Funatsu, Yokohama; Toshikiyo Hirata, Samukawa, both of Japan

[73] Assignee: Toyo Tsushinki Kabushiki Kaisha, Kawasaki, Japan

[21] Appl. No.: 843,657

[22] Filed: Oct. 19, 1977

[30] Foreign Application Priority Data

Oct. 22, 1976 [JP] Japan .................................. 51-127471

[51] Int. Cl.² .............................................. G01S 9/56
[52] U.S. Cl. ......................... 343/6.5 LC; 343/112 CA
[58] Field of Search ................... 343/6.5 LC, 112 CA

[56] References Cited

U.S. PATENT DOCUMENTS

| | | | |
|---|---|---|---|
| 3,469,079 | 9/1969 | Stansbury | 343/112 CA X |
| 3,732,563 | 5/1973 | Nelson | 343/6.5 LC |
| 3,866,221 | 2/1975 | Hikosaka | 343/6.5 LC |

Primary Examiner—T. H. Tubbesing

[57] ABSTRACT

A collision avoidance system for aircraft using an onboard beacon interrogator. If altitude information is not included in a response signal from a transponder of an other aircraft or the response signal is garbled because a plurality of other aircraft are responding to the same interrogation signal, the system automatically switches to a beacon based proximity warning system and indicates the distance or other indication to the detected aircraft.

6 Claims, 8 Drawing Figures

FIG_5
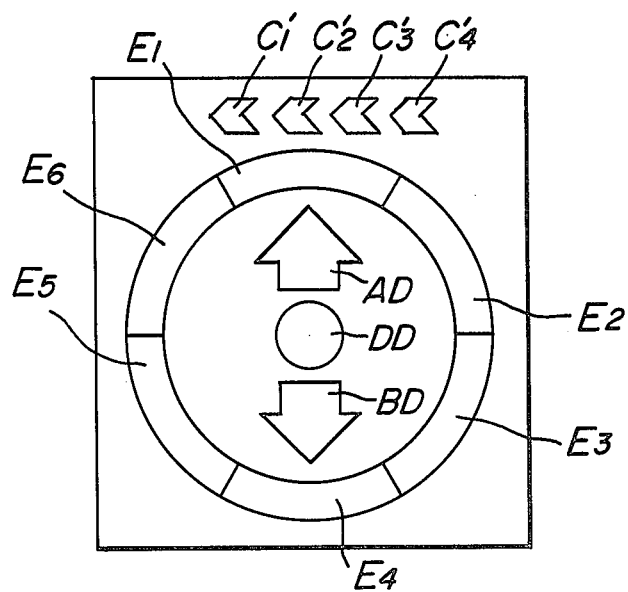
FIG_6
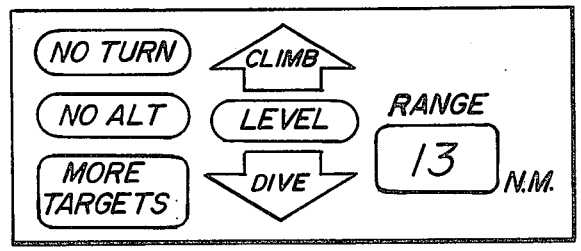

COLLISION AVOIDANCE SYSTEM OF AIRCRAFT

BACKGROUND OF THE INVENTION

1. Field of the Invention

The present invention relates to a collision avoidance system for aircraft including transponders such as ATC, SIF, IFF or DABS transponders. More particularly, the present invention relates to a collision avoidance system for aircraft, incorporating transponders, to provide proximity warning indications to a pilot in the absence of altitude information from other aircraft, normally used as a collision avoidance indication, and indicating to the pilot a direction for evasive flight to avoid collision. The proximity warning indication may comprise one or a combination of (a) distance between one's and an other aircraft, (b) approaching speed, and (c) time to collision.

2. Description of Prior Art

In a conventional system for collision avoidance of aircraft, when altitude information of an other aircraft is not obtained, instructions to a pilot are not available as to direction of flight for collision avoidance. In the conventional system, the pilot is frustrated by the failure to receive such information and cannot take evasive action until such information is obtained.

SUMMARY OF THE INVENTION

The objective of the present invention is to provide a collision avoidance system in which a beacon based collision avoidance indication is switched to a beacon based proximity warning indication when a response signal from an aircraft, responding to an interrogation signal transmitted from a beacon collision avoidance system (BCAS) in the interrogating aircraft corresponds to the following two conditions:

(1) When the received response signal from the responding aircraft does not contain altitude information.

(2) When the response signal from the responding aircraft is received with altitude information from a number of other aircraft in superposition.

Our novel collision avoidance system is necessary for the following reasons.

A first reason is that although a large number of aircraft incorporate transponders, there are still a considerable number which are not equipped with devices capable of providing altitude information to its transponder. The response signal transmitted from such aircraft will not have altitude information.

When the altitude of an interrogated aircraft is not obtained, the altitude difference between the two aircraft cannot be ascertained, in which event, a direction for evasive flight flight cannot be provided. This increases the danger of collision.

A second reason is that in an aerial space proximate to a terminal, where a substantial number of aircraft navigate, the probability is high that a number of aircraft will lie nearly in the same range from one's own aircraft. In such circumstance, a number of response signals from a plurality of such aircraft will be superposed within the framing pulses. Due to such superposition, the altitude information contained in the respective response signal from each aircraft cannot separately be identified. Therefore, the altitude of the respective aircraft is unknown so that the relative altitude difference cannot be obtained and hence once again, appropriate instructions as to the direction of evasive action will not be issued to the pilot. This also entails a dangerous situation. In the conventional system, there is loss of evasion instructions to the pilot which increases the risk of collision.

The system of the present invention is predicated on the fact that should the abovementioned conditions (1) and (2) exist, the relative distance between one's and an other aircraft can still readily be detected based on the time difference of framing pulses of the response signals received from other aircraft.

According to the system of the present invention, the measurable distance between one's and other aircraft is indicated to the pilot under conditions when an indication of collision evasion direction is otherwise unobtainable. The information distinguishes between approaching and departing aircraft.

In accordance with the system of the present invention, it is thus possible to provide a pilot with information sufficient to avoid collision.

BRIEF DESCRIPTION OF THE DRAWINGS

FIGS. 5 and 6 show embodiments of indicators according to the present invention.

DESCRIPTION OF THE PREFERRED EMBODIMENTS

The invention will now be described with reference to the accompanying drawings.

Figure 1:
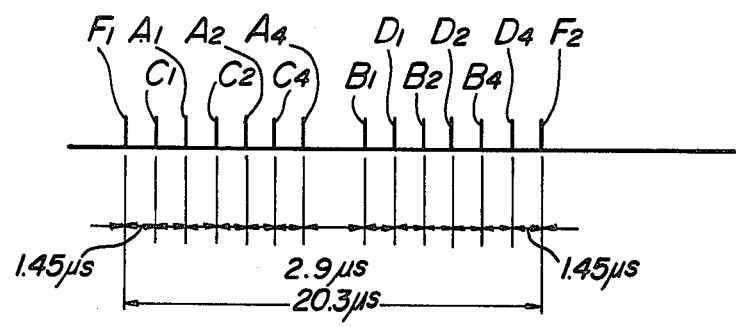
FIG. 1 shows the pulse form of a transponder response signal.

The response signal of a transponder is internationally standarized. FIG. 1 shows a typical pulse form according to such standard.

In FIG. 1, $F_1$ and $F_2$ are framing pulses, pulse $F_2$ occuring 20.3 $\mu$seconds after formation of pulse $F_1$. There are 12 information pulses arranged between said framing pulses $F_1$ and $F_2$. These information pulses are represented in FIG. 1 by $A_1$, $A_2$, $A_4$; $B_1$, $B_2$, $B_4$; $C_1$, $C_2$, $C_4$ and $D_1$, $D_2$, $D_4$. The altitude information corresponds to combinations of presence and absence of these information pulses.

A response signal from an aircraft which is not equipped with an altitude information device will not contain the information pulses, it will only have the two framing pulses $F_1$ and $F_2$. The pulse interval of 20.3 $\mu$s of the framing pulses corresponds to 6,090 m of the propagating electromagnetic wave. This distance corresponds to 3,045 m considering the distance between aircraft and as will be appreciated is a considerable distance. Accordingly, the probability of a plurality of aircraft lying within this range from one's aircraft is considerable. In such case, the response signals of the transponders of other aircraft will overlap each other in the framing pulses. Should such overlapping occur, the altitude of the aircraft cannot be detected.

Figure 2A:
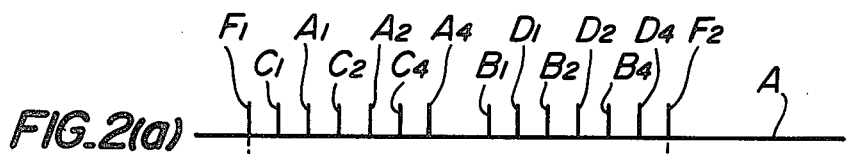
FIG. 2(a) shows the pulse form of a transponder response signal of an aircraft A.
Figure 2B:
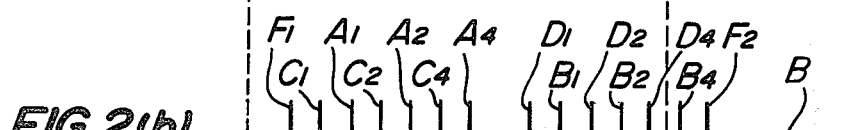
FIG. 2(b) shows the pulse form of a transponder response signal of a further aircraft B.
Figure 2C:
FIG. 2(c) shows the superposed pulse series of FIGS. 2(a) and 2(b)

FIG. 2 covers the case when there are two aircraft A and B which respond to an interrogation. FIG. 2(a) shows the response signal of aircraft A. FIG. 2(b) shows the response signal of aircraft B. FIG. 2(c) shows the signal of aircraft A and B in the form received by the collision avoidance system in one's aircraft.

The signal representation in FIG. 2(c) is termed "garbling". When the signals are garbled, the information pulses of aircraft A and B cannot be separated so that the altitude of each aircraft is not known. However, use can be made of an earlier arriving framing pulse Fm of the two response signals from aircraft A and B to detect the distance from one's aircraft to that aircraft irradiating said earlier arriving pulse.

Figure 3:
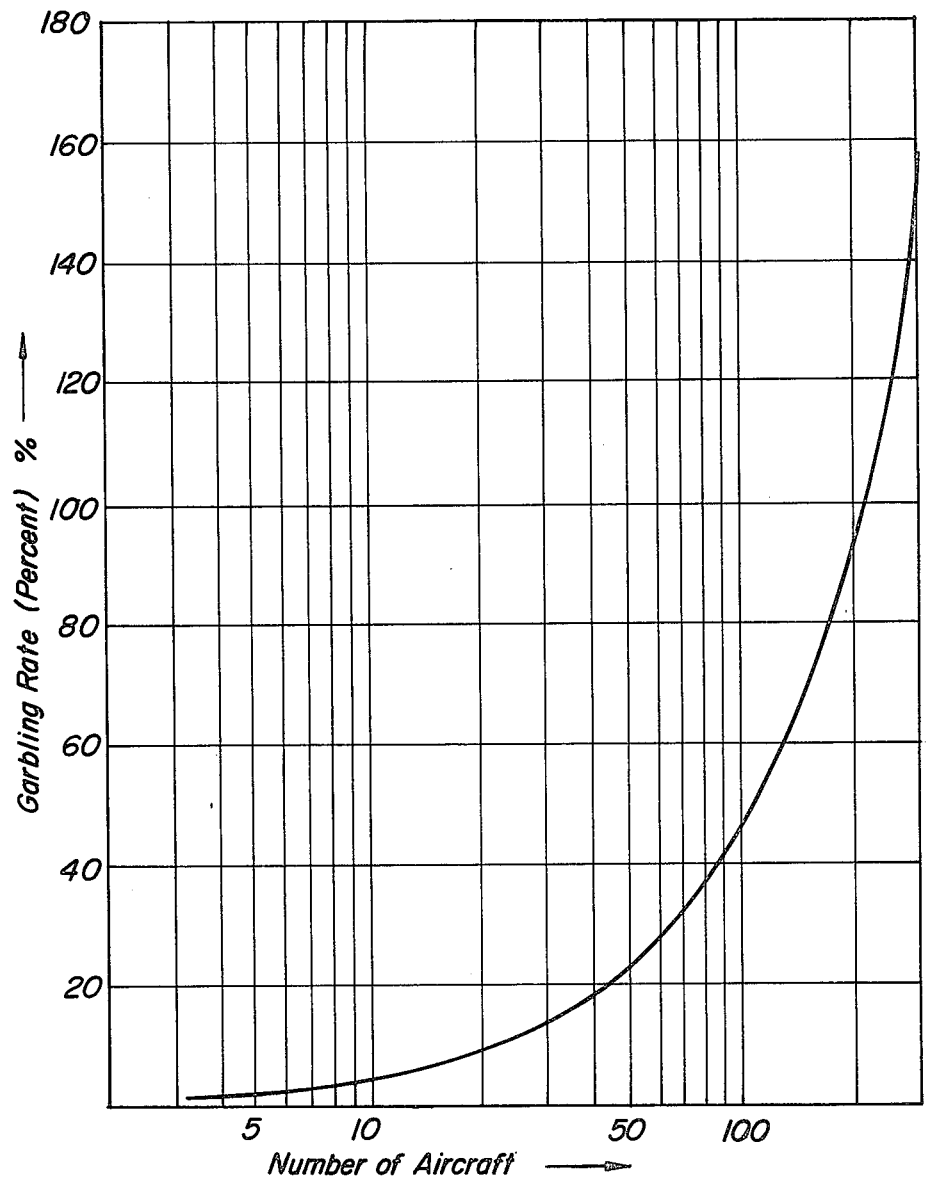
FIG. 3 is a plot of the number of aircraft flying in detectable range of the collision avoidance system of one's aircraft vs. the rate of superposition of the pulse series of the response signals.

FIG. 3 shows the relationship between garbling rate or the rate of superposition of a plurality of response signals from a plurality of aircraft vs. the number of aircraft. Along the abscissa of FIG. 3 is plotted the number of aircraft within an aerial zone of 60 NM (nautical mile) which is the customary aeronautical control range, and along the ordinate thereof is plotted the garbling rate in percent caused by aircraft within a radius of 14 NM, from an interrogation source which distance is the supervision range for a collision avoidance system. The curve of FIG. 3 is predicated on the assumption that the aircraft are uniformly distributed in the range of supervision.

As seen from the curve of FIG. 3, if there are 100 aircraft navigating in an aerial zone of 60 NM radius, about 46% of the response signals from the transponders of responding aircraft result in superposition as above explained.

Figure 4:
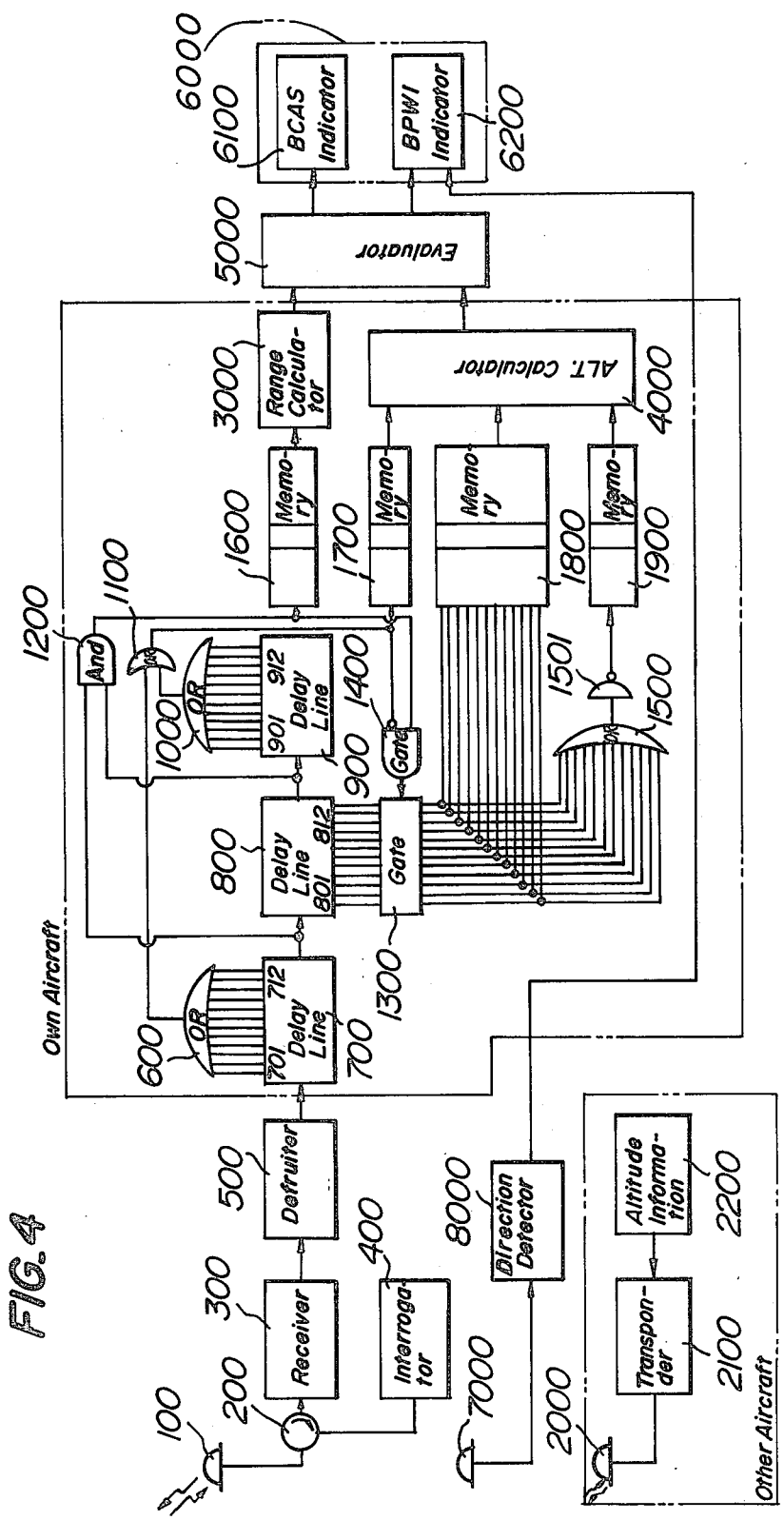
FIG. 4 is a block diagram of an embodiment of the system of the present invention.

FIG. 4 is a block diagram of one embodiment of the present invention. An interrogation signal is generated in an interrogator 400 and is irradiated from an antenna 100 via a circulator 200. This interrogation signal is received by a transponder 2100 in an aircraft within a radius of 14 NM via its antenna 2000. The transponder 2100 detects the interrogation signal and irradiates a response signal after a time delay of $(3 \pm 0.5)$ $\mu$s. The transponder 2100 receives the output of altitude information device 2200, i.e. the altitude of the aircraft and this information is contained in the response signal.

The pulse wave form of the response signal is shown in FIG. 1. This response signal is received by the antenna 100 of the interrogating aircraft after a predetermined time delay which depends on the distance between the interrogating and the responding aircraft. The received response signal passes through the circulator 200 and is amplified and detected in receiver 300. The output of the receiver 300 is supplied as an input to defruiter 500. The defruiter 500 is a known circuit which functions to detect, among other response signals, only the response signal component which corresponds to the interrogation signal of the interrogating aircraft. Accordingly, in the output from the defruiter 500, the response signals to interrogation signals from other than one's interrogating aircraft or ground secondary surveillance radar (SSR) stations are eliminated and the output contains only the response signals to the interrogations from one's aircraft. This output signal is supplied as the output to a delay line 700.

Three delay lines 700, 800 and 900 are provided in the circuit elements for providing switching to the beacon based proximity warning indicating in accordance with the present invention.

Each of the delay lines 700, 800 and 900 has a time delay of 20.3 $\mu$s and is provided with taps to produce time delays of 1.45 $\mu$s respectively. This time delay interval coincides with the time interval of the transponder response signal thereby enabling ready detection of the response signal.

The detected response signal at the output from defruiter 500 is applied as the input to delay line 700 and passes therethrough. The response signal appears at the output of delay line 700 after a time delay of 20.3 $\mu$s and is then applied to the next delay line 800.

In the delay line 800, precisely when the framing pulse $F_1$ appears at its output, the framing pulse $F_2$ appears at its input. As seen in FIG. 1, the time difference between the two framing pulses $F_1$ and $F_2$ is 20.3 $\mu$s. Since the time delay provided by delay line 800 is also 20.3 $\mu$s, the very instant that framing pulse $F_1$ appears at the output of delay line 800 the framing pulse $F_2$ appears at the input of delay line 800.

AND gate 1200 is provided and comprises a circuit element for detecting coincidence of the output $F_1$ with the input $F_2$. This AND gate 1200 accordingly acts to detect the two framing pulses $F_1$ and $F_2$ and thus confirms the presence of a response signal. On coincidence, the AND gate 1200 provides an output which is recorded in a memory circuit 1600 as a value representing the distance.

The confirmation of presence of the response signal by AND gate 1200, which occurs on coincidence of the two framing pulses $F_1$ and $F_2$, takes place at a time when all the information pulses of the response signal have already passed through the delay line 700 but have not yet been supplied as an input to the delay line 900. Accordingly no signal appears at output terminals 701–712 and 901–912. Hence, no output is obtained from OR gates 600 and 1000. Consequently, no output is obtained from OR gate 1100 which provides an output when an output is available from OR gate 600 or 1000. In the absence of an output from the OR gate 1100, an inhibit gate 1400 will not be inhibited.

Under the conditions described, the information output pulses only appear on the intermediate output taps 801–812 which correspond to the pulse interval of 1.45 $\mu$s of the information pulses on the delay line 800. As the inhibit gate 1400 is not inhibited in the absence of an output from either OR gate 600 or OR gate 1000, the output of the AND gate 1200 passes through the inhibit gate 1400 and opens gate 1300. On opening of the gate 1300, the pulse signals on the output taps 801–812 are supplied on one hand to a memory 1800 through the gate 1300 and stored in the memory as the altitude information of the responding aircraft. The pulse signals on taps 801–812 are supplied, on the other hand to an OR gate 1500, which in the presence of pulse signals on taps 801–812 delivers an output signal indicating that the response signal from the responding aircraft contained information pulses, representing its altitude, between framing pulses $F_1$ and $F_2$.

However, if the response signal from the responding aircraft contains no such altitude information pulses between the framing pulses $F_1$ and $F_2$, in this case, although an output is provided by AND gate 1200 which opens gate 1300 no output will be supplied by OR gate 1500 since there are no reply signals with elevation information at output taps 801–812. With no output from OR gate 1500, the fact that the response signal does not have altitude information will be recorded in memory 1900 via converter circuit 1501.

Now to be described is the detection of garbled signals. For this purpose, it is assumed that an interrogation signal from interrogater 400 was irradiated from the antenna 100 through the circulator 200 and there is received in response thereto two transponder signals from two aircraft A and B by the same antenna 100. The pulse wave form of the received signals will also be assumed to be in the form shown in FIG. 2(c). This garbled signal is amplified and detected in the receiver 300, as previously described, and after passing through the defruiter 500 appears at the input of the delay line 700.

As shown in FIG. 2(c), the response signal from aircraft A arrived sooner than that from aircraft B, and the series of pulses of the response signal in FIG. 2(a) passes through the delay lines 700 and 800 earlier than the series of pulses of the response signal in FIG. 2(b). As previously described, the framing pulse $F_1$ of the aircraft A appears at the output of the delay line 800 at the same time the framing pulse $F_2$ appears at the input of the same delay line 800. The AND gate 1200 thereby provides an output pulse to signify arrival of a response signal. At this moment, the response signal shown in FIG. 2(b) of the aircraft B is still passing through the delay line 700 since it is slightly delayed with respect to the response signal of FIG. 2(a). Accordingly, the information pulses may appear at some of the output taps 701–712. If some of the information output pulses appear at the output taps, an output from OR gate 600 will be obtained. Therefore, for convenience of disclosure it is assumed that some of the information output pulses appear at the taps 701–712.

If the information signal appears on some of the output taps 701–712, OR gate 600 delivers an output, which acts to inhibit the gate 1400 through OR gate 1100 and at the same time serves to record the presence of a further response signal having altitude information and thus the existance of garbling in a memory 1700.

By the inhibition of the gate 1400, the altitude information pulses at taps 801–812 will not be recorded in the memory 1800 due to the closure of gate 1300 by inhibit gate 1400 even if a response signal had been detected. In this case, the OR gate 1500 will not deliver an output, in the absence of which the memory 1900 fails to memorize altitude information.

When the response signal of FIG. 2(a) of aircraft A reaches the delay line 900 and the framing pulse $F_1$ and $F_2$ of the response signal of FIG. 2(b) of aircraft B appears at the output and input respectively of the delay line 800, at this instant also, a determination is made as to the existance of a response signal, as previously described, so that AND gate 1200 provides an output which is recorded in the memory 1600.

With the response signals from aircraft A and B already having passed through delay line 700, there will be no response signal in the delay line 700. However, the response signal shown in FIG. 2(a) of aircraft A, being in the process of passing through delay line 900 will appear at the output taps 901–912. By the presence of such information pulses on some of the taps 901–912, the OR gate 1000 provides an output signal, which in turn provides an output from the OR gate 1100 and inhibits the gate 1400 and at the same time the garbling is recorded in the memory 1700 and no altitude information is recorded in the memory 1800 because gate 1300 is maintained closed. At this time, no output is provided by the OR gate 1500. The memory circuit 1900 fails to record altitude information in such case.

To summarize, the response signals of the aircraft responding to the interrogation signal from one's aircraft are sequentially recorded in the memory 1600 in a position in dependence on their order of arrival which is a function of distance. In parallel with such recording, signals indicating presence or absence of garbling for respective response signals are recorded in the memory 1700. If there is no garbling, there will be no output from OR gate 1100 so that inhibit gate 1400 will not be inhibited. In that case, the altitude information of a responding aircraft is recorded in the memory 1800. If the responding aircraft does not have an altitude information device, it will not contain altitude information in the response signal and this fact is recorded in the memory 1900. On the other hand, if there is garbling, the altitude information even if contained in the response signal cannot be utilized since the altitude information will not be recorded in the memory 1800 and its absence is recorded in memory 1900.

The memory circuits 1600, 1700, 1800 and 1900 are formed of shift registers known per se. The shift registers may be shifted at a predetermined time interval for example at 0.29 $\mu$s intervals. By this arrangement, when the output signal of the AND gate 1200 is recorded in memory 1600, for indicating the reception of a response signal of an aircraft, this output signal is simultaneously recorded in all the other memory circuits 1700, 1800 and 1900 respectively used for recording garbling, altitude information and absence of altitude information. Thus it is possible to record all the data in the order of arrival of the receiving signal on the time axis of the respective memory circuits as a series of information data.

After termination of the above described operations for response signals to interrogations from one's aircraft, the memory circuits 1600 and 1800 deliver the recorded response signals simultaneously to a range calculator 3000 and to an altitude calculator 4000, respectively.

In the range calculator 3000, the range value obtained by the latest interrogation is compared with a range value obtained by the immediately preceding interrogation, for example, 3 seconds prior to the latest interrogation to obtain a difference, $\Delta R$. The latest range value R, after compensating for the response delay time of $3\pm0.5$ $\mu$s and the fixed time delay 20.3 $\mu$s of the delay line 700, is divided by $\Delta R$ to provide the time to collision (hereinafter referred to as R-TAU). In parallel with the determination of R-TAU, the altitude difference $\Delta ALT'$ between one's and the other aircraft is obtained in the altitude calculator 4000. By using this information and that $\Delta ALT'$ between one's and an other aircraft obtained in the previous measurement, the rate of altitude variation, i.e. relative ascension rate or descension rate is obtained. If the two aircraft are relatively ascending or descending, the time before arriving at the same altitude $\Delta ALT/\Delta ALT'$ (hereinafter referred to ALT-TAU) is calculated. The results of these calculations in the range claculator 3000 and the altitude calculator 4000 are supplied to an evaluator 5000.

The evaluator 5000 functions to judge other aircraft as threat aircraft under the following conditions; when the output R-TAU of the range calculator 3000 is less than 25 seconds or the distance between the aircraft is less than 1.8 NM. Threat conditions may also be judged when the R-TAU is less than 40 seconds or when the range between aircraft is less than 0.8 NM, or the altitude calculator 4000 indicates less than $\pm800$ ft or its ALT-TAU is nearly equal to R-TAU. The evaluated presence of threat is fed to an indicator 6000. The indicator 6000 indicates the direction of evasive movement, for example, ascent, or descent or level flight through a B-CAS indicator.

When R-TAU is determined to be less than 40 seconds, or less than 1.8 NM, or R-TAU is determined to be less than 25 seconds, or less than 0.8 NM, as determined by the output of the range calculator 3000 and if altitude information is not obtained from altitude calculator, the indicator 6000 is switched from beacon based collision avoidance (B-CAS) indicator 6100 to beacon based proximity warning (BPWI) indicator 6200 by an output signal from the memory circuit 1700 or 1900. The proximity warning (BPWI) indicator 6200 indicates the distance between one's aircraft and the threat aircraft, the approaching speed or time to collision (R-TAU).

By additionally using directivity antenna 7000 and associated direction detector 8000 it is also possible to indicate approaching direction.

As previously noted, the present invention is characterized in that the beacon based collision avoidance indication is switched to beacon based proximity warning indication when either of the described two conditions is detected; i.e. the received response does not contain altitude information or if it does, the response signal is garbled. The detection of either of these conditions is effected by the series connection of 3 delay lines 700, 800 and 900, each having a total time delay of 20.3 $\mu$s and intermediate taps of 1.45 $\mu$s. The middle of the series of delay lines, i.e. delay line 800 in FIG. 4 detects the response signal after a delay time of 20.3 $\mu$s resulting from its passage through delay line 700. By the detection of the response signal, the altitude information is read by the intermediate taps 801–812 arranged at space of 1.45 $\mu$s. If one or more of the intermediate taps 701–712 or 901–912 of the preceding or succeeding delay line 700 or 900 respectively, detect an information signal, the presence of garbling is judged in which case gate 1300 remains closed so that memory 1800 will not be supplied with altitude information and memory 1900 will record the absence of altitude information.

Further by using shift registers and operating them at a certain time after commencement of interrogation, altitude information (memory 1800), garbling signal judgement (memory 1700) or absence of altitude information (memory 1900) is recorded in parallel simultaneously with the detected response signals (memory 1600). The switching signal for changing the indication from BCAS to BPWI is provided by reading the shift registers comprising the garbling detecting memory circuit, the memory circuit for judging absence of altitude information as well as the range information memory circuit.

FIG. 5 shows an embodiment in which the beacon based collision avoidance indication and the beacon based proximity warning indication are housed in one lamp indicator.

In the collision avoidance indication, AD instructs the pilot to ascend, BD instructs the pilot to descend and DD instructs the pilot to assume a level course.

In the proximity warning indication, C'$_1$, C'$_2$, C'$_3$, C'$_4$ each indicate different distances between one's and another aircraft. For example, C'$_1$ indicates less than 1 NM, C'$_2$ less than 3 NM, C'$_3$ less than 5 NM and C'$_4$ less than 8 NM. DD provides an approaching warning indication to the pilot when for example the distance between aircraft becomes 0.8 NM or the time to collision becomes less than 40 seconds in which event the altitude difference is neglected. As previously mentioned if a directional antenna 7000 is provided, the direction of the aircraft can also be indicated.

In FIG. 5, six segments of a circle in the form of an arc E$_1$, E$_2$, E$_3$, E$_4$, E$_5$ and E$_6$ denote 6 subdivided directions. For example, if segment E$_1$ is lit up, it means there is an aircraft in a direction of $\pm 30°$ in front of one's aircraft.

FIG. 6 is a further modified embodiment of a lamp indicator in which the collision avoidance indication and the proximity warning indication are combined. In the collision avoidance indication, "NO TURN" indicates to the pilot prohibition against turning which occurs when the time to collision is less than 40 seconds, and the altitude difference becomes within $\pm 800$ ft. If the time to collision is less than 25 seconds and the altitude difference is within a range of $\pm 800$ ft, lamp "CLIMB" instructs the pilot to ascend, lamp "DIVE" instructs the pilot to descend and lamp "LEVEL" instructs the pilot to navigate at a constant elevation. If there are two or more of such aircraft, a lamp indication "MORE TARGETS" is turned on.

In the proximity warning indication, "NO ALT" indicates the time to collision is less than 40 seconds and the altitude information of the other aircraft is unobtainable. The indicator "RANGE" indicates the distance to the other aircraft. If there are two or more of such other aircraft, the lamp "MORE TARGETS" is also turned on.

The present invention has particular utility during the transition period when aircraft are equipped with altitude information devices since as noted, at the present time, there are a substantial number of aircraft which are not equipped with such devices. It is expected that considerable time will pass before the majority of aircraft are equipped with altitude information devices. During such transition period the present invention mitigates the danger of conventional systems.

What is claimed is:

1. In a collision avoidance system for aircraft equipped with transponders which transmit response signals to interrogations from interrogating aircraft, means within the interrogating aircraft operative on receipt from an interrogated aircraft of response signals which contain information denoting a threat condition for indicating to the interrogating aircraft pilot, as a beacon based collision avoidance indication, a direction to navigate to avoid collision, and means within the interrogating aircraft operative on receipt from the interrogated aircraft or response signals from which desired elevation information is absent for automatically switching from said beacon based collision avoidance indication to a beacon based proximity warning indication for indicating one or more of (a) the distance between the interrogating and the interrogated aircraft, (b) the approaching speed of the aircraft, (c) time to collision or (d) relative flying direction.

2. In the system of claim 1, wherein three delay lines are provided each having a predetermined time delay corresponding to the time interval between framing pulses of the response signal from the transponder of interrogated aircraft, each delay line having intermediate taps of predetermined time interval, the delay lines being connected in a series circuit.

3. In the system of claim 2, wherein the center of the three series connected delay lines has an input and an output which are supplied to an AND gate whose output signal represents receipt of a response signal, said intermediate taps of said center delay line being connected to an OR gate, the non-existence of an output signal from said OR gate with an output from said AND gate denoting the absence of altitude information whereby to cause said second-named means to switch from the beacon based collision avoidance indication to the beacon based proximity warning indication.

4. In a collision avoidance system for aircraft equipped with transponders which transmit response signals to interrogations from interrogating aircraft, means within the interrogating aircraft operative on receipt from an interrogated aircraft of said response signals for indicating to the interrogating aircraft pilot, as a beacon based collision avoidance indication, a direction to navigate to avoid collision, and means within the interrogating aircraft operative on receipt from a plurality of transponders in interrogated aircraft of response signals having framing pulses, within which the respective response signals are superposed, for automatically switching from said beacon based collision avoidance indication to a beacon based proximity warning indication for indicating one or more of (a) the distance between the interrogating and the interrogated aircraft, (b) the approaching speed of the aircraft, (c) time to collision or (d) relative flying direction.

5. In the system of claim 4, wherein three delay lines are provided each having a predetermined time delay corresponding to the time interval of said framing pulses, each delay line having intermediate taps of predetermined time interval, the delay lines being connected in a series circuit.

6. In the system of claim 3, wherein the center of the three series connected delay lines has an input and an output which are supplied to an AND gate whose output signal represents receipt of a response signal, and wherein a delay line preceding or succeeding the center delay line has a signal output from their intermediate taps, said signal output representing a superposition of response signals from interrogated aircraft and effects operation of said second-named means to switch from the beacon based collision avoidance indication to the beacon based proximity warning indication.

* * * * *